United States Patent
Chen et al.

(10) Patent No.: US 8,204,795 B2
(45) Date of Patent: *Jun. 19, 2012

(54) ENVIRONMENT CUSTOMIZATION BASED ON LOCATION

(75) Inventors: Jennifer H. Chen, San Jose, CA (US); Robert Sayko, Colts Neck, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,236

(22) Filed: Feb. 17, 2011

(65) Prior Publication Data

US 2011/0138024 A1    Jun. 9, 2011

Related U.S. Application Data

(62) Division of application No. 09/834,562, filed on Apr. 13, 2001, now Pat. No. 7,908,211.

(51) Int. Cl.
    G06Q 30/00 (2006.01)
(52) U.S. Cl. ...................... 705/26.1; 709/227
(58) Field of Classification Search ............... 705/26.1; 709/227
    See application file for complete search history.

(56) References Cited

U.S. PATENT DOCUMENTS

| | | |
|---|---|---|
| 6,202,023 B1 | 3/2001 | Hancock et al. |
| 6,578,075 B1 | 6/2003 | Nieminen et al. |
| 7,395,031 B1 * | 7/2008 | Ritter ............................. 455/77 |
| 2002/0073331 A1 | 6/2002 | Candelore |

* cited by examiner

*Primary Examiner* — Jagdish Patel
(74) *Attorney, Agent, or Firm* — Cantor Colburn LLP

(57) ABSTRACT

A user's location is automatically transmitted to a network, and the network automatically customizes one or more environments, such as by customizing communication devices, other types of devices, or the like, based on the detected location and on profile information. Customizing an environment may include enabling services, such as setting up a public telephone or hotel telephone with a user's home base telephone settings and/or services, and/or may include disabling functions, such as disabling long-distance service when the user is away from home.

7 Claims, 5 Drawing Sheets

ENVIRONMENT CUSTOMIZATION BASED ON LOCATION

CROSS-REFERENCE TO RELATED APPLICATIONS

This application is a divisional of U.S. patent application Ser. No. 09/834,562 filed Apr. 13, 2001, the contents of which are incorporated by reference herein in their entirety, which is related to U.S. patent application Ser. No. 09/072,784, filed Jan. 27, 1998, now abandoned, and U.S. patent application Ser. No. 09/651,852, filed Aug. 31, 2000, now U.S. Pat. No. 6,725,303, issued Apr. 20, 2004, the contents of which are incorporated by reference herein in their entireties.

BACKGROUND OF THE INVENTION

1. Field of Invention

This invention relates to customizing environments for users.

2. Description of Related Art

Some telecommunications service providers offer a "follow-me" call-forwarding service that allows a user to forward his or her calls to a location other than a location normally associated with the number dialed by a calling party as exemplified by U.S. patent Ser. No. 09/013,995 "GPS-Based Follow-Me Call Forwarding Service" filed Jan. 27, 1998, and assigned to AT&T. For example, the user may instruct that calls placed to his or her office telephone are to be forwarded to a home telephone or a mobile phone. Such services are convenient and new technology may be leveraged to further develop such convenient features.

SUMMARY OF THE INVENTION

This invention provides environment customization systems and methods that customize one or more environments, based on a user's (or any other object's) location. According to the invention, a location of a transmitter associated with a user (or object) is detected, and a profile is obtained. The one or more environments are customized based on the location and the profile.

Customizing an environment may include modifying settings of one or more devices at a particular location. For example, when on a business trip, a user's computer, e-mail server, etc. at work may be changed to forward received e-mail to the user's personal digital assistant (PDA) and the user's facsimile machine may be changed to forward facsimiles to a co-worker's facsimile machine and to send a return facsimile indicating that the user is away on a trip and to indicate that the facsimile is being handled by the co-worker. The environments of multiple locations may be included. For example, when a transmitter is detected at a location away from a user's home, an environment at the current location of the transmitter (e.g., a hotel) may be customized, and an environment at the user's home may also be customized.

The customization of an environment may include enabling and/or disabling one or more functions, by sending commands, downloading files, etc. to devices at the customized locations. For example, a personal computer may be customized by changing initialization parameters and/or by changing device drivers, for example. New locations of the user may be transmitted to a customization device via a network and the customization device may customize any device reachable via the network.

These and other objects, advantages and salient features of the invention are described in or apparent from the following description of preferred embodiments.

DETAILED DESCRIPTION OF PREFERRED EMBODIMENTS

This invention provides an environment customization system that customizes one or more environments, based on a user's (or any other object's) location. For example, when the user is traveling and checks into a hotel, the user's location determined by a Global Positioning System (GPS) device, for example, may be transmitted to a network. The network may then customize an environment to be engaged by the user, such as the television service in the user's hotel room (e.g., set the hotel TV to the user's "home base" cable TV channels), the user's call forwarding service (e.g., forward calls to the user's hotel room telephone), and the temperature of the hotel room (e.g., set the hotel room temperature to be the same as the user's home, or a traveling temperature pre-specified by the user), provided that these devices are controllable from a central control device capable of accepting customization commands.

Environments at other locations may be customized. For example, the user may have had problems in the past with unauthorized users (e.g., friends of the user's children or the like) making long-distance telephone calls from the user's home telephone while the user is away. Therefore, the user may disable long-distance service from the home telephone when the user is more than 100 miles away from home.

Various other services or service options could also be customized. For example, Cable TV channels or programs may be restricted (or expanded). The heat in the user's home may be adjusted (e.g., turned down when the user is away), and various lights, may be cycled on or off based on different parameters to simulate occupancy provided appropriate control devices are provided to control these mechanisms. A rental car may be customized (via wireless connection) to the user's preferences such as seat adjustments, air condition temperature, radio stations and/or the like assuming a control mechanism is available for controlling these devices. Thus, the customization system may provide customized environments based on the physical location of a person.

Figure 1:
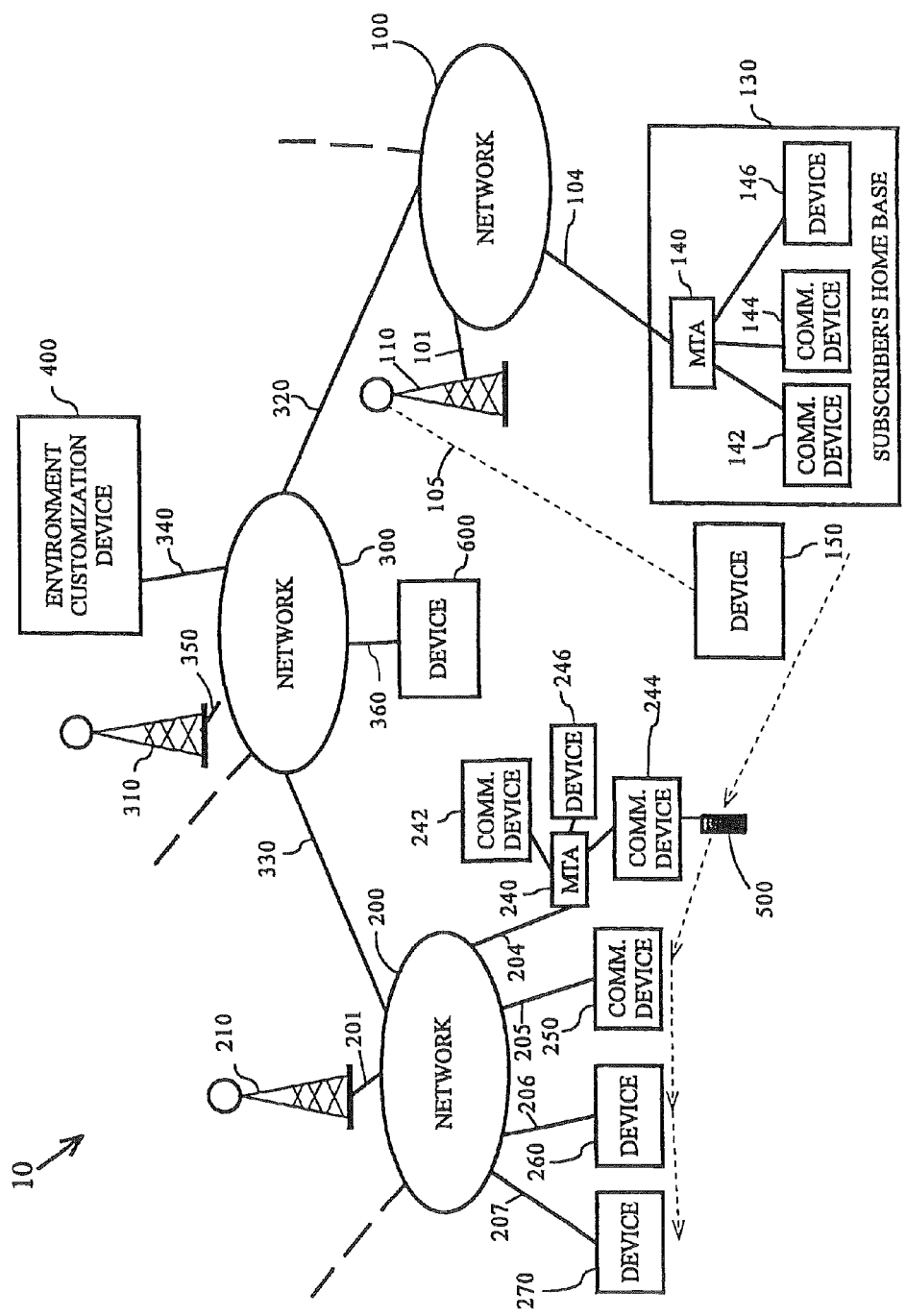
FIG. 1 is a diagram of an automatic environment customization system.

FIG. 1 is an exemplary diagram of an environment customization system 10. The environment customization system 10 may include one or more networks such as networks 100, 200 and 300. The networks 100, 200 and 300 may be combinations of any types of networks, but for this example it is assumed that networks 100 and 200 include hybrid fiber coaxial (HFC) networks, and that the network 300 includes an Internet protocol (IP) network (e.g., the World Wide Web). Each of the networks 100 and 200 are coupled to various devices. For example, the network 100 may be coupled to one or more wireless towers that wirelessly transmit and/or receive information, such as wireless tower 110; a device 150, which may be a car with a wireless link 105 to the network 100; and/or a multiple-terminal adapter (MTA) 140 that provides connections between many devices such as devices 142-146 in a home (home base 130) and the network 100, for example. Towers such as the wireless tower 110 may provide for wireless communications such as pages, cell phones, personal digital assistants with wireless links, etc. Similarly, the network 200 may be coupled to a wireless tower 10, MTA 240 supporting devices 242-244, and devices 250-270. The network 300 may also be coupled to a wireless tower 310, an environment customization device 400, and a device 600.

The device 600 may be any device controllable by the environment customization device 400. For example, the device 600 may be a computer such as public PC in an airport or the like, or a computer at the user's friend's house, the user's office, or the like.

While shown as a centralized device coupled directly to the network 300, the environment customization device 400 may be coupled to any of the networks 100-300 or be distributed throughout the networks 100-300, its functions being performed by various devices such as servers and routers, for example, within each of the networks 100-300. For ease of discussion, the environment customization device 400 is assumed to be a centralized device coupled directly to the network 300 as shown in FIG. 1.

A user of the environment customization system 10 may establish a base location to serve as a physical location reference point. This base location may be referred to as a home base. While convenient, a user need not establish a home base, but may identify one or more reference points on which the environment customization system 10 may base its decisions for taking certain customization actions. For the remainder of this description, a home base is assumed to be the reference point for ease of understanding.

The MTA 140 of the home base 130 may have attached a set top box (STB) or other suitable type of Customer Premise Equipment (CPE) that can receive and transmit various types of information to/from the network 100. For example, the MTA 140 may be adapted to handle telephone communications, cable TV transmissions, digitized information to/from the user's computer, etc., and may also be able to control various devices within the user's home, represented by devices 142-146, such as lights, heat, etc. (assuming that these devices have been adapted to interact with the MTA 140 and execute commands received from the MTA). For example, the devices 142-146 may be a telephone, a television set, and a thermostat that controls the temperature in the user's home.

Each of the devices 142, 144 and 146 may be provided with an ability to set a device configuration based on received signals from the MTA 140. Thus, these devices 142-146 may be configured as desired by the user. For example, the communication device 142 (a telephone) may have a plurality of speed dial buttons (e.g., dial a telephone number by pushing a speed dial button). The telephone numbers assigned to each of the speed dial buttons may be set as a configuration for the telephone. Thus, the MTA 140 may set and read the configured telephone numbers and the speed dial buttons that are assigned. The communication device 144 (a television) may also be configured to receive a specified set of stations assigned to user-selected channel numbers. For example, NBC may be assigned to Channel 4 while CBS may be assigned to Channel 9, etc. (It should be appreciated that the configuration may be in the MTA 140, rather than in the communication device 142 and/or 144 itself.) Similarly, the device 146 (a thermostat) may be configured to maintain the temperature at 65° F. during the day from 6 a.m. and 70° F. at night after 8 p.m.

The device 150 (a car) may have various devices that may each be controlled in response to user commands. For example, the car 150 may contain electronically controlled power seats, power mirrors, radio and a speed governing device responsive to user commands received via link 105. All of these devices may be configurable to specific settings by the environment customization device 400 via the networks 300 and 100.

The environment customization device 400 may detect a user's location and control one or more environments based on the location and on stored profile information. The user may carry a transmitter 500, which is a device that provides the environment customization device 400 with away to geographically locate the user. The transmitter 500 may, for example, be a Global Positioning System (GPS)-based transmitter that receives position information from GPS satellites (not shown), determines its position based on the GPS information, and transmits the position to the environment customization device 400 via the networks 100-300. The transmitter 500 may transmit a unique identification signal along with the position information so that it can be distinguished from other transmitters.

Other physical location detection methods may also be used. For example, cellular telephones periodically transmit an identification signal that is unique to each cellular telephone. Thus, this identification is used to indicate the location of the cellular telephone with a resolution relating to base station locations. Therefore, the cellular network may automatically forward location information to the customization device 400 every time a signal is received from a given telephone, or to transmit an updated location to the networks 100-300 each time a position change is detected for the given telephone. Thus, the signal transmitted from the transmitter 500 does not necessarily contain actual position information.

In the following examples, the transmitter 500 is portable. However, a stationary device, such as a public pay phone, a personal computer, or the like, may serve as the transmitter. For example, a user may call the environment customization device 400 from a hotel telephone and speak into the telephone receiver or input a personal identification number (PIN) or the like. The environment customization device 400 could then determine where the call was coming from using well-known methods, and determine who the caller was based on voice recognition, the input PIN, or the like. As another example, a user could send an e-mail request including the PIN or the like, and the environment customization device 400 could then determine the user's location based on where the e-mail was coming from, and distinguish the user using the PIN.

Figure 2:
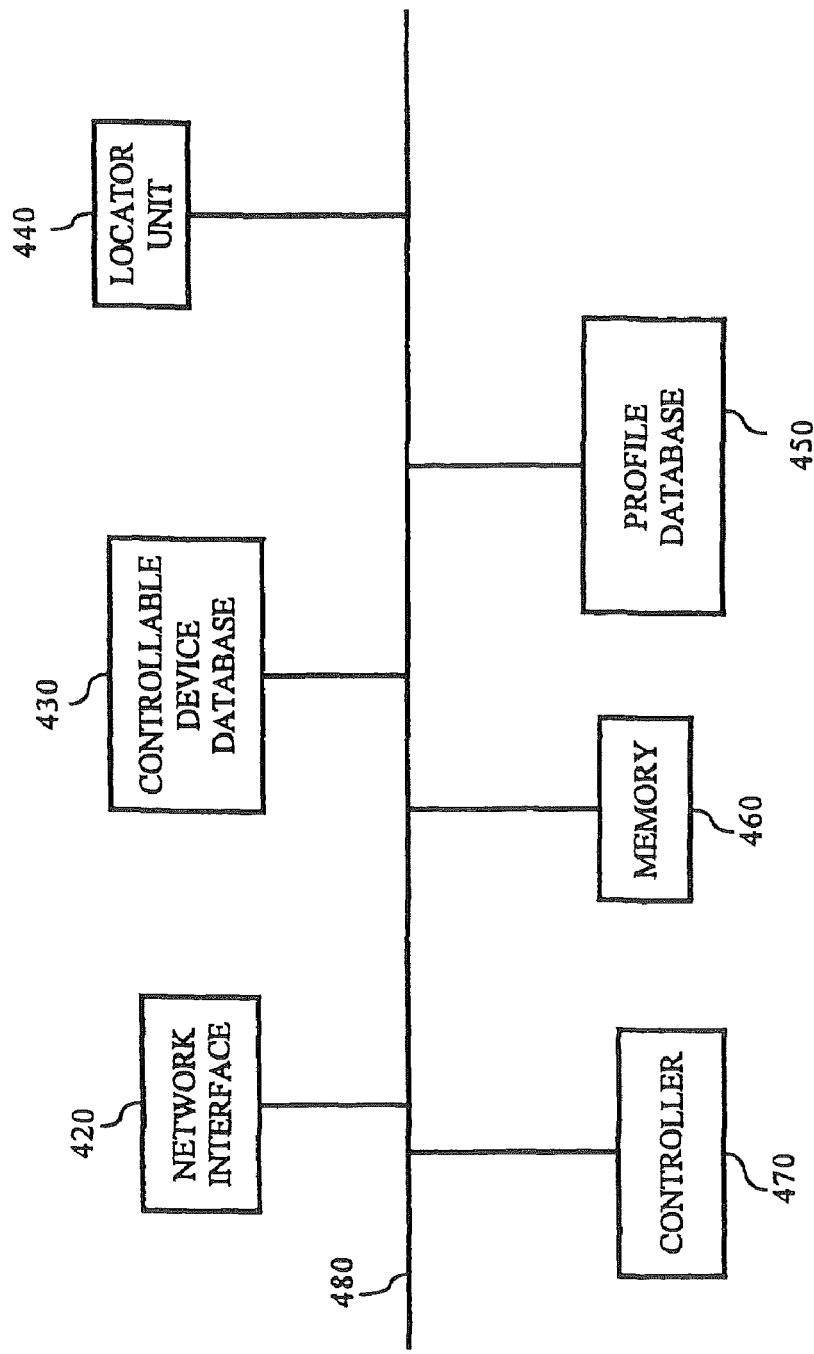
FIG. 2 is an exemplary block diagram of an environment customization device 400 of FIG. 1.

FIG. 2 shows an exemplary embodiment of the environment customization device 400. The environment customization device 400 may include a network interface 420, a controllable device database 430, a locator unit 440, a profile database 450, a memory 460, and a controller 470, all of which may be interconnected by a bus 480. While FIG. 2 shows a bus architecture, any type of architecture may be used as is well known to one of ordinary skill.

The memory 460 may store any necessary control programs or data used by the controller 470, and may serve as a buffer if needed for information going into or out of the environment customization device 400. The controller 470 accesses various databases which are part of/used by the environment customization device 400, generates control signals as needed, and transmits and/or receives control signals via the network interface 420. Portions of stored data may also be located in the networks 100-300. Thus, these portions may be received via the network interface 420 but are assumed to be part of memory 460 for convenience.

The controllable device database 430 stores information relating to devices or environments that may be customized via the networks 100-300. For example, information relating to the MTA 140, 240, the devices 142, 242-146-246 may be stored in the controllable device database 430. Basically, the controllable device database 430 stores information such as a description (available functions, etc.) of all devices accessible by the environment customization device 400, along with position information (if appropriate) indicating the devices' position with respect to the network(s). Table 1 gives an example of information stored in the controllable device database.

TABLE 1

| Location | Location description | Device | Available functions/service | Settings |
|---|---|---|---|---|
| 1 | John Smith's home base | MTA | — | — |
| | | Computer | Microsoft Word | Tool bar; macro; template; clip art |
| | | | Microsoft Excel | Formulas, etc. |
| | | | America Online | Home page setting |
| | | | . | . |
| | | | . | . |
| | | | . | . |
| | | | *Check profile | *Check profile |
| | | | . | . |
| | | | . | . |
| | | | . | . |
| | | Telephone | Call forwarding | *Check profile |
| | | | Call waiting | — |
| | | | Long-distance | 10-10-811, . . . |
| | | | Local service | — |
| | | | Caller ID | — |
| | | | Adjustable volume | 70 dB |
| | | | Speed dial | SD1 = 419-856-1234 |
| | | | | SD2 = 703-123-4567 |
| | | | | . |
| | | | | . |
| | | | | . |
| | | | *Check profile | *Check profile |
| | | | . | . |
| | | | . | . |
| | | | . | . |
| | | Television | Interactive functions | — |
| | | | Cable service | ESPN, HBO, . . . |
| | | | *Check profile | *Check profile |
| | | | . | . |
| | | | . | . |
| | | | . | . |
| | | Thermostat | — | 65° F. at 6am to 8pm; 70° F. at 8pm to 6am |
| | | . | | |
| | | . | | |
| | | . | | |
| 2 | Marriot Hotel in Reston, VA (Room 1105) | MTA | — | — |
| | | Computer | Microsoft Word | — |
| | | | *Check profile | *Check profile |
| | | Telephone | Local service | — |
| | | | Speed dial | *Check profile |
| | | | *Check profile | *Check profile |
| | | Thermostat | — | 60° F. |
| | | . | | |
| | | . | | |
| | | . | | |
| 3 | Dulles International Airport | Public Telephone | Adjustable volume | *Check profile (default = 55 dB) |
| | | | Speed dial | *Check profile |
| | | . | | |
| | | . | | |
| | | . | | |
| — | — | John Smith's car | Seat position | Height = 18 cm |
| | | | | Forward/back = 4 cm back from middle position |
| | | | | Seatback tilt = 110° from seat |

TABLE 1-continued

| Location | Location description | Device | Available functions/service | Settings |
|---|---|---|---|---|
| | | | Radio | Memory 1 = 98.7 FM<br>Memory 1 = 90.9 FM<br>.<br>.<br>. |
| | | | Speed governor | *Check profile<br>(Default = Not active) |
| | | | Climate control | 68° F. |
| .<br>.<br>. | | | | |

*"Check profile" entries indicate that a profile should be consulted to determine whether to enable or disable functions, and to determine setting information.

It should be appreciated that, when resolution of the position locator system is high enough (i.e., when position can be determined with enough accuracy), the devices in Table 1 may each be listed as being in a separate location. In other words, for example, Table 1 considers all devices at John Smith's home to be in "Location 1"; but if the position locator system has high enough resolution to differentiate locations within John Smith's home base, then the telephone, television, computer, etc. may be listed at separate locations.

Furthermore, it can be appreciated that some devices are not listed by location. For example, it would be meaningless to associate a location with John Smith's car, since it is mobile and will change location often.

The locator unit 440 determines the current location of a user based on communications received via the network interface 420. Thus, the locator unit 440 is able to identify individual users, and to determine locations of devices from which communications are received.

When a communication is received, the locator unit 440 identifies the user via information from the communication, such as a header of a data packet, for example. The user may be identified by name, a special code such as a personal identification number (PIN), or the like. If a telephone is used, for example, the user may enter the PIN by pressing appropriate keys of the telephone dial pad. The locator unit 440 may also distinguish the user using voice recognition, for example. Once the user is identified, the locator unit 440 may retrieve the user profile from the locator database to further process the communication, such as by making position updates.

The locator unit 440 may obtain position information of the user in several ways. For example, the position information may be received via the towers 110, 210 or 310 (FIG. 1) via the network interface 420, and may include the exact position of the user if the device used by the user has GPS capability. In this case, the locator unit 440 stores the most recently received position information transmitted from the user's transmitter 500 in a locator database. The position information of each successive transmission may replace the previous position information in the locator database. The transmitter 500 may transmit the user's location at periodic intervals (e.g., every five minutes), for example. The frequency of the transmitter position information updates may be set by the user or receive a default system value, for example. The frequency of the updates may be set as the need arises. For example, the transmitter 500 may be turned off for a substantial period of time. When the user desires to apply the customization function, a transmit button may be pressed so that the environment customization's device 400 may acquire the position and customize the user environment as appropriate. For example, if the user uses a controlled personal computer while traveling, such as a public PC, the transmitter 500 may be activated to initialize the personal computer with the user's desired configuration.

If the communication does not include any position information, the user's position may be inferred. For example, if a cell phone (or other wireless device) is used and the base station identification is included in the communication, then the locator unit 440 may approximate the user position by determining the base station location. Although not as precise, the base station location may be sufficient to determine the type of processing that is required based on the user profile. For example, the user profile may specify customization of home and office if the user is over 500 miles away from home. In such a case, the base station location may be adequate indication to make the customization decision.

Other position inferences may also be made. For example, if the user calls using a pay phone, the locator unit 440 may determine the position of the pay phone by accessing a telephone database using the pay phone identification. If the user makes contact by logging on the Internet, for example, the locator unit 440 may determine the user location via the log-on ID, the Internet service provider (ISP) server ID, etc. Thus, explicit indication of the user's position may not be necessary for customization decisions.

Table 2 shows an example of information contained in the locator unit 440.

TABLE 2

| User | Current location |
|---|---|
| John Smith | Location 1 |
| Mary Smith | Location 1 |
| Jane Johnson | Location 2 |
| . | . |
| . | . |
| . | . |

The profile information stored in the profile database 450 indicates how particular environments, such as particular devices, should be customized for a given user. For example, a user's profile may include the user's telephone settings (e.g., speed-dial buttons or the like) and/or subscribed-to features (e.g., call-waiting, call-forwarding and the like) and/or authorized level of access (e.g., long-distance service or the like). A user's profile may also contain information such as the user's preference for thermostat settings, preferred radio stations and/or seat position in an automobile, computer editor settings for toolbar, macros, etc., and the like. Also, profiles may indicate preferences for various environments, such as hotel, rental car and various geographical conditions assuming such locations are controllable. Table 3 shows an example of a portion of the information that may be contained in a profile.

TABLE 3

| Type of Visiting Site | Personal Computer | Telephone | Television | Temperature |
|---|---|---|---|---|
| Hotel | Office | Home and Office | Home | 70° F. |
| Resort | Home | Home | Home | 70° F. |
| Home | *Reference | *Reference | *Reference | — |
| Client 1 | Office 1 | Office | N/A | N/A |
| Client 2 | Office | Office | N/A | N/A |
| Client 3 | Office 2 | Office | N/A | N/A |
| Field Office | Office | Office | N/A | 70° F. |
| Roadside | N/A | Home and Office | N/A | N/A |
| Airport | Office | Home and Office | Home | N/A |
| Restaurant | Home | Office | N/A | N/A |
| Rental Car | Office | Office | N/A | 65° F. |
| Airplane | Home and Office | N/A | Home | N/A |
| . | . | . | . | . |
| . | . | . | . | . |
| . | . | . | . | . |
| Unknown | Home | Home | Home | N/A |

*"Reference" indicates that the settings of the indicated device are used as a reference.

In Table 3, it can be seen that some devices are to be set with settings corresponding to the user's home device settings, some devices are to be set with settings corresponding to the user's office device settings, and some devices are to be set with settings corresponding to both the user's office device settings and home device settings. When the user visits Client 1, for example, a personal computer is customized according to an "Office 1" command. The "Office 1" command is, for example, a command that enables only those functions, programs and/or information applicable to Client 1. When the user visits Client 2, the "Office" command is applied, which sets a computer at Client 2 with the same settings as the settings in the user's office computer. When the user visits Client 3, an "Office 2" command is used for customization. The "Office 2" command is, for example, a command that enables only those functions, programs and/or information applicable to Client 3.

If there is a conflict—for example, when the profile indicates to customize using both "Home" and "Office" command—an appropriate scheme may be implemented for resolving conflicts. For example, when customizing a telephone in a hotel room, if the "Office" speed dial buttons are different from the "Home" speed dial buttons, the "Office" speed dial buttons may be given priority, or the speed dial buttons may be shared between the "Home" and "Office" command. For example, the first five speed dial buttons of the hotel room telephone may be set to correspond to the first five speed dial buttons in the "Office" command, and the next five buttons of the hotel room telephone may be set to correspond to the first five speed dial buttons of the "Home" command.

In Table 3, the user's home is used as a reference location. However, another location, such as the user's office, could also be used as a reference location, or one location could serve as a reference for some devices while another location serves as a reference for other devices. Further, it can be appreciated that not every parameter needs to reference an existing setting. For example, the user's home thermostat is not used as a reference because, for example, the user prefers a different temperature than is normally maintained at his or her home.

Table 4 shows an example of another portion of the information that may be contained in a profile. Specifically, Table 4 shows examples of different environments that may be customized based on how far the user is from his or her home base.

TABLE 4

| | Distance 1 | Distance 2 | Distance 3 |
|---|---|---|---|
| Customization Sites | Home, Car, Visiting site | Office, Visiting site | Home |

In Table 4, if Distance 1 is 50 miles, for example, then the user's home, car, and current site that he or she is visiting will be customized when the user is 50 miles (or more) from home. If Distance 2 is 25 miles, for example, then the user's office and current site that he or she is visiting will be customized when the user is 25 miles away from home. For example, the user's office may be about 25 miles from home, and the user may visit neighboring offices. Thus, about 25 miles would be an appropriate distance at which to perform customization of the office and any local sites visited. If Distance 3 is five miles, then the user's home will be customized when the user is five miles or more away from home.

The environment customization device 400 may execute a program that essentially performs logical functions in the form of if-then-else statements, such as if <condition> then <action list 1> else <action list 2>. An action list is a set of one or more actions. The condition may be a regular expression which has a Boolean value of "TRUE" or "FALSE". For example, the condition may be A AND B where A has a Boolean value of TRUE if the transmitter 500 is 25 miles or more away from the home base 130; otherwise, A has a value of FALSE. B has a value of TRUE if the current location is near a public telephone; otherwise, B has a value of FALSE. Thus, A AND B will have a value of TRUE if the transmitter 500 is 25 miles or more away from the home base 130 and is near a public telephone.

Actions may be specifications taken by the environment customization device 400 to customize devices or environments. Thus, the environment customization device 400 may customize environments based on logical values of Boolean variables combined using operators in regular expressions specified by the subscriber. The operators may include any mathematical operators (e.g., algebraic/set operators such as $>, <, =, -, \div, \times, \subset, \subseteq, \supset, \supseteq, \not\subset, \cup, \cap, \in, \notin, \forall, \exists, \ni$, etc., and Boolean operators such as AND, OR, NOT, XOR, etc.).

It should also be appreciated that, rather than using logic as described above, an artificial intelligence engine or the like could be used to determine environment customizations.

A user's profile may also contain one or more codes for collecting configuration data, such as by retrieving setting information from a location such as the user's home base 130. For example, a code may be included which requires retrieval of configuration information, such as home base telephone, television, computer and thermostat settings, if the user's location is greater than 50 miles from a reference point (e.g., the office location). Thus, when the user leaves home, the setting information from the home base 130 is retrieved by the environment customization device 400 and kept ready for use, if necessary, in customizing environments to which the user may travel.

It should be appreciated that the controllable device database 430, the locator unit 440, the profile database 450 and the memory 460 may actually be part of a same memory device, or may be distributed among one or more of the networks 100-300.

Figure 3:
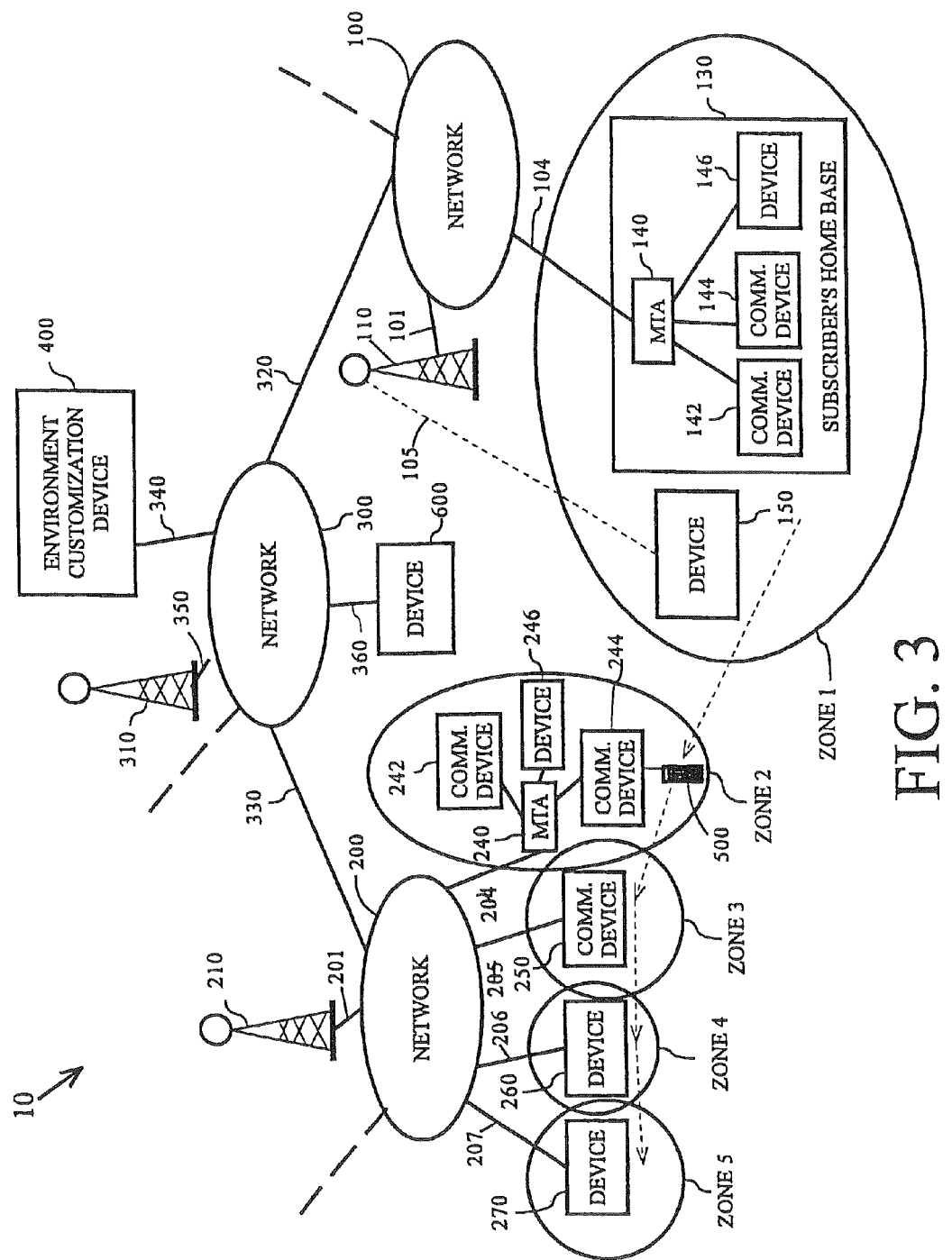
FIG. 3 is a diagram of the automatic environment customization system of FIG. 1 overlaid by location detection zones.

The controllable device database 430 may organize the controllable devices into zones. For example, the zones may relate to physical location as well as network connections as shown in FIG. 3. Zones 1-5 in FIG. 3 show exemplary positional relationships of various devices connected to the networks 100 and 200. As shown, the user's home base 130 and the device 150 are located in Zone 1. The MTA 240 and its connected devices 242-246 are located in Zone 2. Communication device 250 is located in Zone 3. Device 260 is located in Zone 4, and device 270 is located in Zone 5.

The zones could be used by the environment customization device 400 to quickly determine which devices may be controlled once the location of the user is determined. For example, when the user needs to take a trip to Zone 5 going through Zones 2-4 sequentially on the way, the environment customization device 400 may configure the environment for the user at each zone when the user arrives.

When the environment customization device 400 determines that the user has arrived in Zone 2 (e.g., at a hotel that is connected to the network 200 via the MTA 240), the devices 242-244 (assumed to be associated with the user's hotel room) may be configured based on the user's profile. Thus, the telephone 242, the telephone 244 and the thermostat 246 of the hotel room may be set accordingly. The user profile may instruct configuring the devices at Zone 2 to have the same values as another location, such as home base 130 or the user's office (not shown). For example, the user may specify the telephone to be configured similarly to the telephone at the office while specifying the television to have the same configuration as the home base. If such is the instruction, the environment customization device 400 may retrieve the telephone configuration from the user's office and the television setting for home base and set the corresponding devices at the hotel accordingly.

The environment customization device 400 may also adaptively configure the devices at Zone 2 based on logical instructions in the user profile. For example, the user profile may instruct to first determine all the devices that are available at Zone 2. If the hotel television is not the quality that the user likes, but a personal computer is available with advanced graphics, the user profile may direct that the television be configured to receive only the news channel while the computer be configured to access user favorite sites (e.g., a chat room). However, if the hotel television includes special features (such as two-way interactive TV, for example), the profile may instruct the environment customization device 400 to configure the television for this feature.

Thus, the devices at Zone 2 (or any other zone) need not be set to the same configuration of devices at other locations, but may be freely set as desired.

For example, if the user's home base temperature is set at 65° F. by the device 146 (thermostat) because the user's spouse prefers that temperature, while the user prefers a temperature of 70° F., the user's profile may instruct the device 246 (thermostat) in the hotel room to set the temperature at 70° F., rather than 65° F. Furthermore, the user may wish to have different services available on communication devices when he or she travels than when he or she is at home. For example, the user's home base communication device 144 (television) may have many cable channels, but no interactive functions; and when the user travels, the user may want to have interactive functions available but not wish to view many cable channels. Thus, the user's profile may contain information that instructs the environment customization device 400 to enable different functions in the hotel television 244 than are enabled in the home base television 144.

As described above, the device 150 is, in this example, the user's personal car. When the user leaves Zone 1 and travels to Zone 2, and leaves the device 150 (car) at home, the user may wish to ensure that a teenager living at the user's home base 130 does not drive the automobile 150 faster than 55 miles per hour. Thus, the environment customization device 400, upon detecting that the user is out of Zone 1, activates a speed governing device (not shown) in the automobile 150 that prevents the automobile 150 from going faster than 55 miles per hour. The automobile 150 may also have a position transmitter so that the environment customization device 400 may, for example by comparing the automobile's position with the user's position, determine whether the user is in the car.

The user may also wish to prevent long-distance calls from being made from the communication device 142 in the user's absence and thus the environment customization device 400 may, upon detecting that the user has moved to Zone 2, disable long-distance service from the communication device 142. Another example of disabling functions is that the user's computer at work, or at least certain functions of the computer, could be disabled or "locked out" when the user is away from the computer. Thus, the environment customization device 400 provides security measures against unauthorized use of various devices.

Next, assume the user (carrying the transmitter 500) checks out of the hotel, leaves Zone 2 and travels to Zone 3. Communication device 250, which is a public telephone in this example, is located in Zone 3. When the user enters Zone 3, the public telephone may, similarly to the communication device 242 described above, automatically be configured to the user's predefined settings (e.g., credit card number, speed dial by phone if available, and/or sound level) either based on a proximity criteria or a request from the user activated by pressing a button on the transmitter 500, for example. Proximity detection may be accomplished in several ways. For example, specially equipped pay phones may detect an intensity of a transmitted signal from the transmitter 500. The transmitted signal may be the location signal or may be a separate weak signal that may be used for this purpose. When the user is within a predetermined distance (12 inches, for example) and a predetermined amount of time (e.g., 20 seconds), then the telephone may send a request to one of the networks 100-200 for configuration information. The proximity information may be obtained using the GPS system if the number of pay phones in the general area is small and the GPS resolution is sufficient to uniquely determine the pay phone that is closest to the user.

Alternatively, the pay phone may not take any action until it is activated by insertion of a coin, for example. After receiving the coin, the pay phone may receive the key entries and transmit the key entries and the identification of the user received via a transmitter signal from the transmitter 500 to the network 100-300. The network 100-300 may in turn send a request to the environment customization device 400 to decode the key entries and respond accordingly.

The user then travels to Zone 4 from Zone 3. Zone 4 is a rental car vendor and the user has reserved a car. When the specific rental car (device 260) has been assigned to the user, the environment customization device 400 may be informed (by the rental car vendor). While the environmental customization device 400 may configure the rental car 260 immediately, this may not be appropriate since during busy periods the rental car 260 may not actually be ready for service. Thus, the environment customization device 400 may wait for a proximity criterion to be met as discussed above. When the environment customization device 400 detects that the proximity criterion is satisfied, the rental car 260 may be configured wirelessly via the networks 200-300. For example, the power seats, radio and power mirrors may all be set according to the user's desires.

Configuring the rental car 260 may be pre-authorized by the rental car vendor, for example. In other words, the rental car vendor may have access to the environment customization system 10 and act as a "gate" that only allows automatic control of rental car settings upon appropriate prepayment to the rental agency by the user.

Continuing with the example, the user drives the rental car 260 to the user's vacation residence in Zone 5, where device 270 is located. The device 270 is a thermostat responsive to user commands from the network 200, and controls the vacation residence temperature based on the user's profile when the user enters Zone 5.

It is also possible to add one or more levels of security to the environment customization system 10. For example, instead of customization by the environment customization device 400 being completely automatic, the user may be required to input a unique code, such as a Personal Identification Number (PIN) or the like, in order to complete the customization information. In this way, an unauthorized user who, for example, stole the transmitter 500 from the authorized user may be prevented from having access to the user's customization features.

Figure 4:
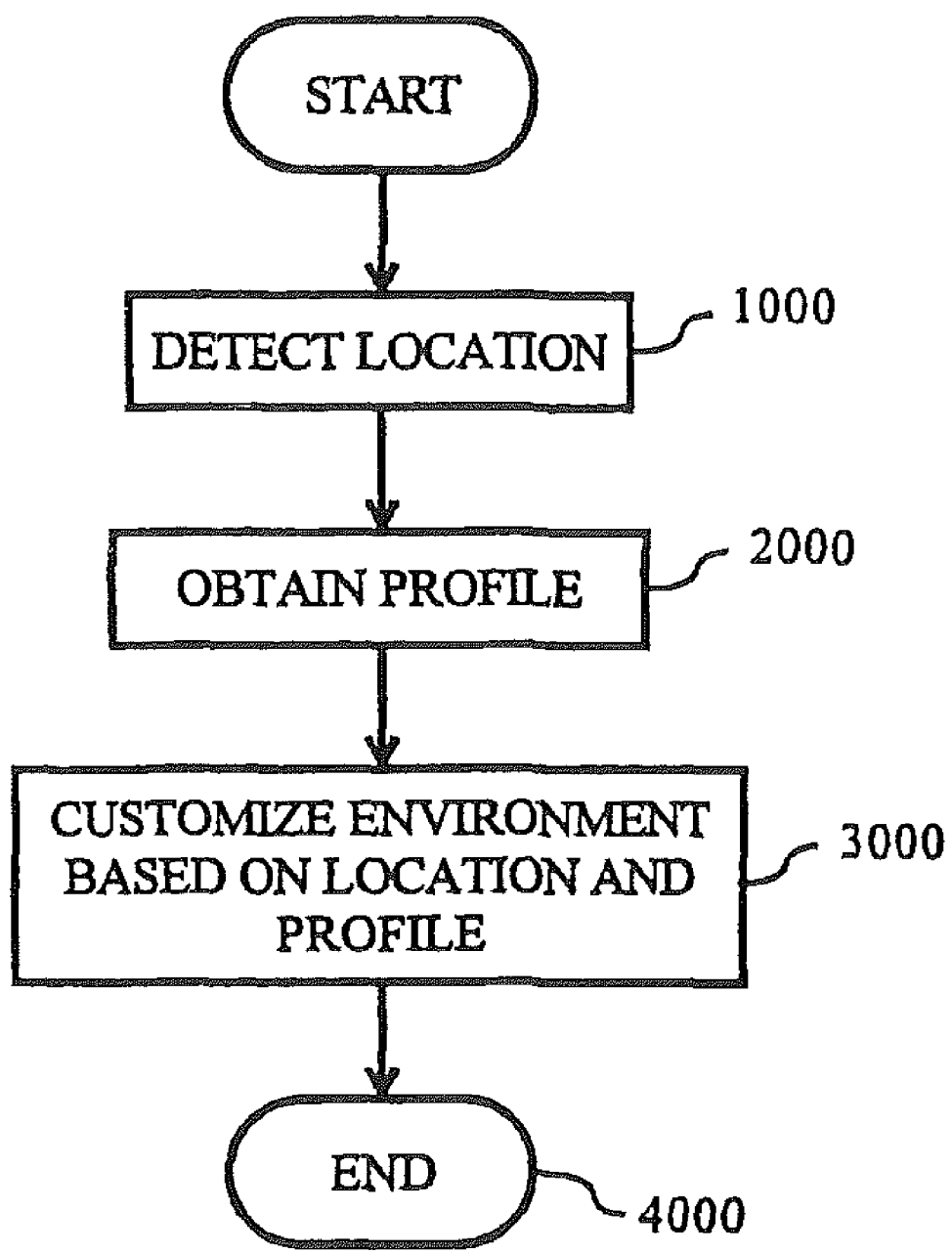
FIG. 4 is a flowchart of an exemplary method for determining a location and customizing an environment.

FIG. 4 is a flowchart of an exemplary method for customizing an environment. In step 1000, the process detects a location based on a signal received from a transmitter 500. In the above-described example, the transmitter 500 was carried by a user, but it should be appreciated that a transmitter 500 associated with a particular user may, rather than being directly carried by the user, be installed in the user's automobile, attached to any object, or the like. As discussed, the transmitter could even be a pay telephone. After detecting the location of the transmitter 500, the process goes to step 2000 and obtains a profile. After obtaining the profile, the process goes to step 3000.

In step 3000, the process customizes an environment based on the location detected in step 1000 and on the profile obtained in step 2000. The environment that is customized may be an environment at the user's current location, or an environment not at the user's current location. Furthermore, in step 3000, more than one environment may be customized. For example, an environment at the user's current location may be customized, and one or more environments at the user's home base may also be customized. The process then goes to step 4000 and ends.

Figure 5:
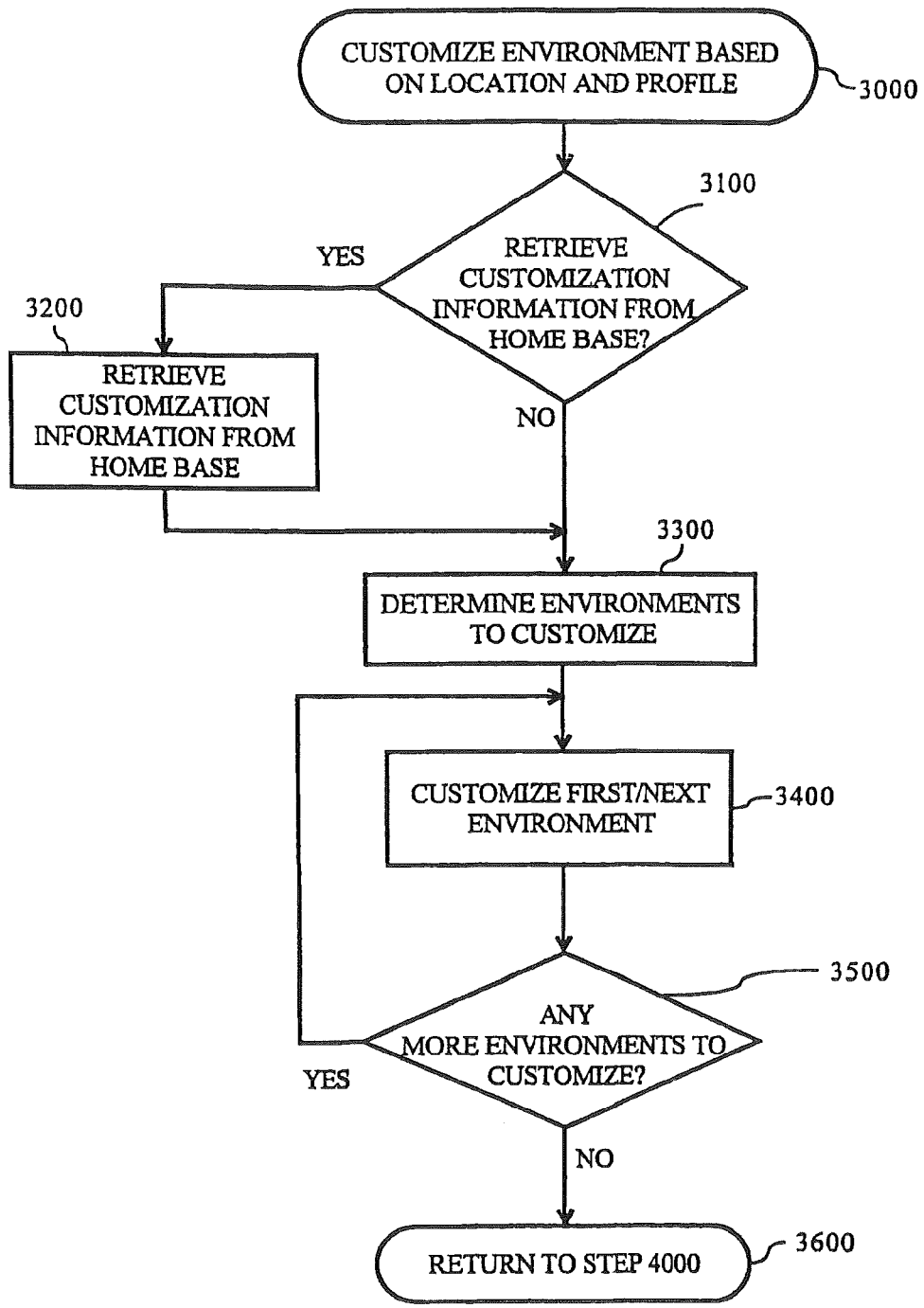
FIG. 5 is a flowchart of an exemplary method for customizing an environment.

FIG. 5 is a flow chart of an exemplary method step 3000 of FIG. 1. In step 3100, the process determines whether any information needs to be retrieved from a location, such as a home base or the user's office, for possible subsequent use. This determination may be based on a profile. For example, the profile may indicate that the user will be on vacation from August 15 through August 24, and thus the environment customization device 400 determines that there is a high likelihood that the home base and/or office information will be needed to customize environments that will be encountered by the user while on vacation. As another example, the environment customization device 400 may be programmed to retrieve the home base information any time the user gets more than 50 miles away from home.

If any information needs to be retrieved, the process continues to step 3200; otherwise, the process goes to step 3300. In step 3200, the process retrieves the customization information, and then goes to step 3300. It should be appreciated that it is possible to retrieve home base information only when an actual need arises, but it may be preferable to retrieve it in advance, as outlined above. For example, if one or more environments at the home base are altered after the user leaves (e.g., the heat is turned down or the long-distance telephone service disabled), then the current setting information would not be correct (i.e., not what the user desires) if it is retrieved after being altered.

In step 3300, the process determines which environment or environments to customize. The environments to be customized may include environments at the user's present location, environments at the user's home base, and/or environments at other locations (e.g., office, relative's house, user's car, etc.). The process then goes to step 3400, customizes the first environment, and goes to step 3500.

In step 3500, the process determines whether there are any more environments to customize. If there are any more environments to customize, the process returns to step 3400 and repeats steps 3400-3500. When there are no more environments to customize, the process goes to step 3600 and returns to step 4000 of FIG. 4.

The environment customization device 400 can be implemented on a general purpose or special purpose computer, a programmed microprocessor or microcontroller and peripheral integrated circuit elements, an applications specific integrated circuit (ASIC) or other integrated or non-integrated circuits, a programmable logic devices such as a PLD, PLA, FPGA or PAL, or the like, or any appropriate combination thereof. In general, any device capable of implementing at least some portions of the flowcharts shown in FIGS. 4 and 5 can be used to implement the environment customization device 400.

While the invention has been described in conjunction with the specific embodiments described above, many equivalent alternatives, modifications and variations 20 will become apparent to those skilled in the art once given this disclosure. For example, the environment customization device 400 is shown in FIG. 2 using bus architecture when any other architecture may be used as is well-known in the art. As another example, although an example was given in which two HFC networks 100 and 200 were linked via an IP network 300, it should be appreciated that the invention may be implemented on a single network, and/or that any other suitable network type or types is possible. Accordingly, the exemplary embodiments of the invention as set forth above are considered to be illustrative and not limiting. Various changes to the described embodiments may be made without departing from the spirit and scope of the invention.

What is claimed is:

1. A customization system comprising:
a network interface; and
a controller coupled to the network interface, the controller:
receiving over a network, user identification and location information for a user;
extracting a current location from the location information;
retrieving a profile for the user, the profile including customization information for a plurality of customizable devices at a plurality of locations including the current location;
communicating over the network with a customizable device at the current location to customize the customizable device based on the customization information in the profile for the current location of the user;
extracting a reference location from the profile;

generating a first list of environments to customize based on a distance between the reference location and the current location; and retrieving a second list of the customizable devices corresponding to each of the environments in the first list.

2. The system of claim 1, wherein the controller retrieves customization logic from the profile, and executes the customization logic to generate the first list of environments.

3. The system of claim 2, wherein the customization logic comprises:

a table listing of environments that are to be customized based on a difference between the current location and the reference location; and an expression of a logical function of status parameters in the profile, the current location and the reference location.

4. The system of claim 2, wherein the controller extracts customization commands from the profile, retrieves configuration data from sources specified in the customization commands, and maps the configuration data to customizable devices in the list of customizable devices.

5. The system of claim 4, wherein the sources specified in the customization commands comprise an already customized environment and a database of configuration data for particular customizable devices.

6. The system of claim 4, wherein the controller matches portions of the configuration data with customizable devices in the list of customizable devices for the environments in the list of environments, collects configuration data for the customizable devices in the list of customizable devices for the environments in the list of environments, and integrates the collected configuration data for the customizable devices.

7. The system of claim 6, wherein the controller identifies a network address for the customizable devices, and sets, via a network, the customizable devices to operate in a manner consistent with corresponding configuration data.

* * * * *